United States Patent
Ishimura et al.

(10) Patent No.: US 11,332,182 B2
(45) Date of Patent: May 17, 2022

(54) VEHICLE STEERING APPARATUS

(71) Applicant: JTEKT CORPORATION, Osaka (JP)

(72) Inventors: Shoji Ishimura, Kashihara (JP); Masaaki Hashimoto, Toyota (JP); Kazuhiro Watanabe, Amagasaki (JP); Naohiro Oosono, Nara (JP)

(73) Assignee: JTEKT CORPORATION, Kariya (JP)

(*) Notice: Subject to any disclaimer, the term of this patent is extended or adjusted under 35 U.S.C. 154(b) by 277 days.

(21) Appl. No.: 16/592,859

(22) Filed: Oct. 4, 2019

(65) Prior Publication Data

US 2020/0130725 A1  Apr. 30, 2020

(30) Foreign Application Priority Data

Oct. 30, 2018 (JP) ............... JP2018-203736

(51) Int. Cl.
- *B62D 5/00* (2006.01)
- *B62D 1/04* (2006.01)
- *B62D 3/12* (2006.01)

(52) U.S. Cl.
CPC .............. *B62D 5/005* (2013.01); *B62D 1/04* (2013.01); *B62D 3/126* (2013.01)

(58) Field of Classification Search
CPC .......... B62D 1/04; B62D 3/126; B62D 5/001; B62D 5/005; B62D 5/006
See application file for complete search history.

(56) References Cited

U.S. PATENT DOCUMENTS

| | | | |
|---|---|---|---|
| 3,049,938 A | 8/1962 | Hulten et al. | |
| 8,640,816 B2 | 2/2014 | Shibahata | |
| 10,988,162 B2* | 4/2021 | Appleyard | B62D 1/16 |
| 10,988,168 B2* | 4/2021 | Shin | B62D 5/0463 |
| 2009/0114470 A1 | 5/2009 | Shimizu et al. | |
| 2018/0105198 A1 | 4/2018 | Bodtker et al. | |
| 2018/0238377 A1* | 8/2018 | Kim | B62D 6/10 |
| 2018/0362079 A1* | 12/2018 | Zuzelski | B62D 3/02 |
| 2020/0130733 A1* | 4/2020 | Hwang | F16H 25/16 |
| 2020/0198698 A1* | 6/2020 | Kiran | B62D 5/062 |
| 2020/0391784 A1* | 12/2020 | Saito | B62D 1/04 |
| 2021/0237793 A1* | 8/2021 | Fujita | B62D 1/16 |

FOREIGN PATENT DOCUMENTS

| | | |
|---|---|---|
| CN | 103325285 A | 9/2013 |
| DE | 102013014134 A1 | 2/2015 |
| JP | H10-194152 A | 7/1998 |
| JP | 2005-178453 A | 7/2005 |
| JP | 2009-113613 A | 5/2009 |

OTHER PUBLICATIONS

Mar. 25, 2020 Extended European Search Report issued in European Patent Application No. 19203182.1.

* cited by examiner

*Primary Examiner* — Jacob D Knutson
*Assistant Examiner* — Harold Eric Pahlck, III
(74) *Attorney, Agent, or Firm* — Oliff PLC

(57) ABSTRACT

A vehicle steering apparatus includes a shaft member, a moving portion, a support member, and a stop portion. The moving portion includes a first abutting surface that faces the stop portion in a circumferential direction of the shaft member. The first abutting surface is inclined with respect to an axial direction of the shaft member to face a shaft support portion side when the moving portion is viewed in a radial direction of the shaft member. The stop portion includes a first abutted surface that abuts the first abutting surface.

12 Claims, 9 Drawing Sheets

VEHICLE STEERING APPARATUS

INCORPORATION BY REFERENCE

The disclosure of Japanese Patent Application No. 2018-203736 filed on Oct. 30, 2018 including the specification, drawings and abstract is incorporated herein by reference in its entirety.

BACKGROUND

1. Technical Field

The disclosure relates to a vehicle steering apparatus provided in a steering mechanism mechanically separated from a steering operation mechanism.

2. Description of Related Art

In a vehicle steering system including a steering mechanism and a steering operation mechanism, in the case where the steering mechanism and the steering operation mechanism are mechanically coupled, the rotation range of a steering shaft is mechanically restricted at the stroke end of a rack coupled to the tires. Whereas, in the case of a linkless steer-by-wire system (hereinafter simply referred to as a "steer-by-wire system") in which a steering mechanism and a steering operation mechanism are mechanically separated, the rotation range of a steering shaft is not mechanically restricted at the stroke end of a rack. If the steering shaft is excessively rotated, a wire (for example, a spiral cable of a steering angle sensor wound around the shaft) in the steering mechanism may be cut. In view of this, a mechanical structure is proposed that mechanically restricts the rotation range of a steering shaft in a steer-by-wire system.

For example, Japanese Unexamined Patent Application Publication No. 2005-178453 (JP 2005-178453 A) discloses a structure that includes a rotation stopper disposed on a rotor connected to a column shaft via a gear, and a fixed stopper disposed on an inner wall surface of a housing, so as to restrict the rotation amount (rotation range) of the column shaft through abutment between the rotation stopper and the fixed stopper.

SUMMARY

According to JP 2005-178453 A, the rotation stopper and the fixed stopper abut each other on a plane parallel to the radial direction and the axial direction of the rotor. That is, the rotation stopper abuts, at its abutting surface perpendicular to its movement direction (the circumferential direction of the rotor), against an abutted surface (the fixed stopper) parallel to the abutting surface. Thus, the rotation stopper is reliably stopped by the fixed stopper. However, when the rotation stopper and the fixed stopper abut each other, stress tends to concentrate on the proximal end of each of the rotation stopper and the fixed stopper. This problem may be solved by increasing the circumferential width of the rotation stopper and the fixed stopper. However, if the circumferential width of the rotation stopper and the fixed stopper is increased, there may arise another problem that the rotation range of a shaft member (the column shaft in JP 2005-178453 A) is reduced.

According to the present disclosure, there is provided a vehicle steering apparatus capable of mechanically restricting the rotation range of a shaft member that rotates in accordance with an operation of a steering member, and having a simple structure and high reliability.

A vehicle steering apparatus according to a first aspect of the present disclosure is provided in a steering mechanism mechanically separated from a steering operation mechanism. The vehicle steering apparatus includes a shaft member, a moving portion, a support member, and a stop portion. The shaft member is configured to rotate in accordance with an operation on a steering member. The moving portion is configured to move in a circumferential direction of the shaft member in accordance with rotation of the shaft member. The moving portion is configured to restrict rotation of the shaft member when movement of the moving portion is stopped. The support member includes a shaft support portion rotatably supporting the shaft member. The stop portion is disposed on the support member. The stop portion is configured to abut the moving portion to stop movement of the moving portion. The moving portion includes a first abutting surface that faces the stop portion in the circumferential direction. The first abutting surface is inclined with respect to an axial direction of the shaft member to face the shaft support portion side when the moving portion is viewed in a radial direction of the shaft member. The stop portion includes a first abutted surface that abuts the first abutting surface.

A vehicle steering apparatus according to a second aspect of the present disclosure is provided in a steering mechanism mechanically separated from a steering operation mechanism. The vehicle steering apparatus includes a shaft member, a moving portion, a support member, and a stop portion. The shaft member is configured to rotate in accordance with an operation on a steering member. The moving portion is configured to move in a circumferential direction of the shaft member in accordance with rotation of the shaft member. The moving portion is configured to restrict rotation of the shaft member when movement of the moving portion is stopped. The support member includes a shaft support portion rotatably supporting the shaft member. The stop portion is disposed on the support member. The stop portion is configured to abut the moving portion to stop movement of the moving portion. The moving portion includes a first abutting surface that faces the stop portion in the circumferential direction. The stop portion includes a first abutted surface that abuts the first abutting surface. The first abutted surface is inclined with respect to an axial direction of the shaft member to face away from the shaft support portion when the stop portion is viewed in a radial direction of the shaft member.

With the above configuration, it is possible to provide a vehicle steering apparatus capable of mechanically restricting the rotation range of a shaft member that rotates in accordance with an operation of a steering member, and having a simple structure and high reliability.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
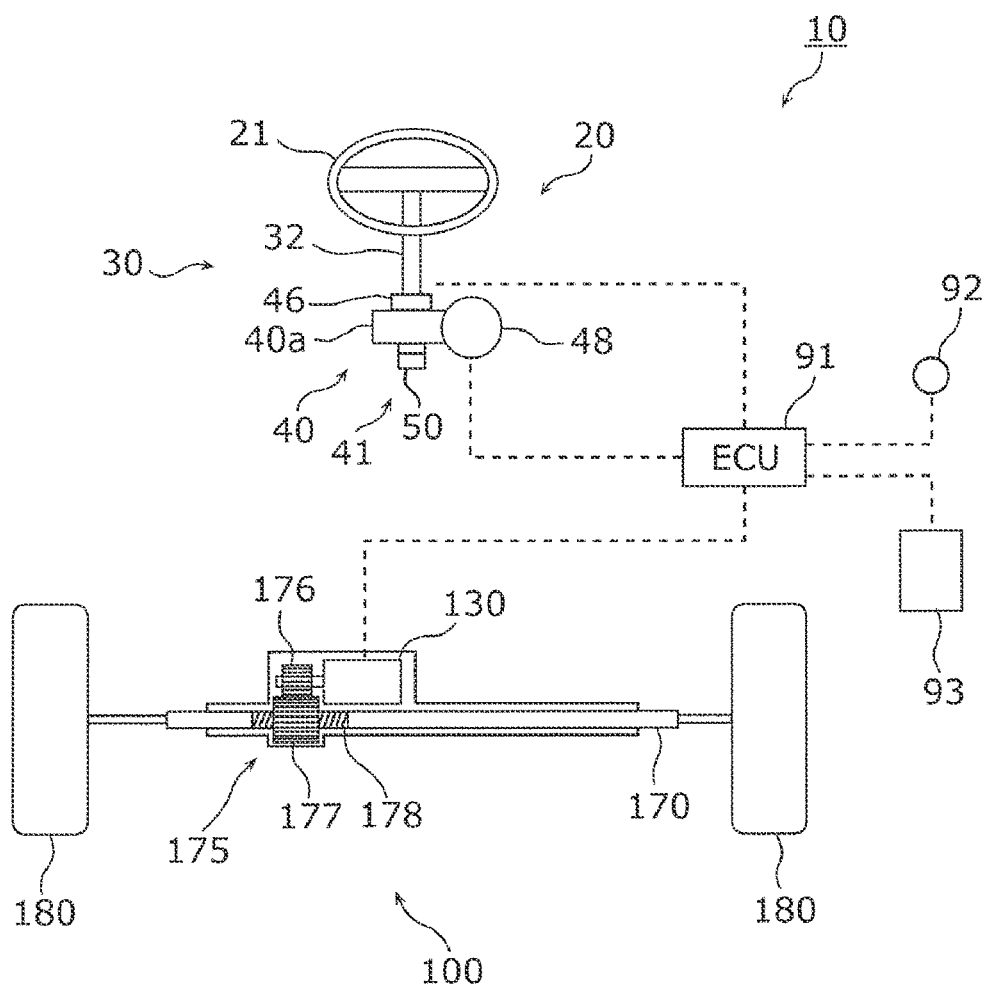
FIG. 1 is a schematic diagram illustrating the configuration of a steering system according to Embodiment 1.

Hereinafter, exemplary embodiments will be described with reference to the drawings. Note that all the embodiments described below illustrate generic or specific examples. The numerical values, shapes, materials, elements, the arrangement and connection of the elements, and so on described in the following embodiments are merely examples, and therefore are not intended to limit the scope of the present disclosure. Further, among the elements described in the following embodiments, elements that are not recited in the independent claim with the broadest scope are described as optional elements.

Moreover, the drawings may include schematic representations in which some elements are exaggerated, omitted, or changed in scale for clarity. The shape, positional relationship, and scale of the elements in the drawings may differ from those of the actual elements. Furthermore, although expressions indicating relative directions or orientations, such as parallel, perpendicular, and orthogonal, are used in the subsequent description of the exemplary embodiments, the directions or orientations indicated by these expressions may not be exactly those directions or orientations. For example, two directions being parallel means not only being exactly parallel but also being substantially parallel. That is, errors within, for example, several percent are allowable. Note that the like elements are denoted by like numerals throughout the drawings, and a description thereof will not be repeated or will be made briefly.

Embodiment 1

Configuration of Steering System

First, a steering system 10 according to Embodiment 1 will be described. FIG. 1 is a schematic diagram illustrating the configuration of the steering system 10 according to Embodiment 1. The steering system 10 includes a steering mechanism 20, a steering operation mechanism 100, and an electronic control unit (ECU) 91.

The steering mechanism 20 is a device that receives an operation for steering from the driver. The steering mechanism 20 includes a steering apparatus 30 and a steering wheel 21. The steering wheel 21 is an example of a steering member operated by the driver for steering. The steering wheel 21 is coupled to a steering shaft 32. The steering shaft 32 is an example of a shaft member that rotates in accordance with an operation of the steering member.

The steering apparatus 30 is an example of a vehicle steering apparatus. The steering apparatus 30 includes the steering shaft 32, a steering angle sensor 46, a reaction force motor 48, and a reducer 40. A rotary member 50 is connected to a reducer-40-side end of the steering shaft 32, so that the rotary member 50 and a housing 40a of the reducer 40 form a stopper unit 41 that restricts the rotation range of the steering shaft 32. The configuration and operation of the stopper unit 41 will be described below with reference to FIGS. 2 to 10.

The steering operation mechanism 100 includes a rack shaft 170 connected to steered wheels 180, a steering operation motor 130, and a reducer 175 that transmits the rotational driving force of the steering operation motor 130 to the rack shaft 170.

The reducer 175 is connected to the steering operation motor 130 and the rack shaft 170, and applies a force for steering the steered wheels 180 to the rack shaft 170 using the steering operation motor 130 as a drive source. The reducer 175 decelerates and increases the rotational driving force of the steering operation motor 130 so as to transmit the resulting force to the rack shaft 170, and also converts the rotational driving force of the steering operation motor 130 into a force in the axial direction of the rack shaft 170 so as to transmit the resulting force to the rack shaft 170. As illustrated, for example, in FIG. 1, the reducer 175 includes a first gear 176 connected to a driving rotary shaft of the steering operation motor 130, and a cylindrical second gear 177 that engages with the first gear 176. The rack shaft 170 extends through the second gear 177. The second gear 177 includes gear teeth on its outer periphery to mesh with the first gear 176, and includes an internal thread on its inner periphery to be threaded onto an external thread 178 on the outer periphery of the rack shaft 170. That is, the rotational driving force of the steering operation motor 130 rotates the second gear 177 via the first gear 176. When the second gear 177 rotates, the rack shaft 170 reciprocates with respect to the second gear 177. As a result, each of the right and left steered wheels 180 connected to the rack shaft 170 via tie rods (not illustrated) is steered in accordance with the movement amount of the rack shaft 170.

The ECU 91 is electrically connected to the reaction force motor 48 and the steering operation motor 130 so as to control the operation of the reaction force motor 48 and the steering operation motor 130. The ECU 91 is electrically connected also to a speed sensor 92 of the vehicle, a battery 93, and a steering angle sensor 46 so as to obtain a signal of the vehicle speed from the speed sensor 92, and obtain a signal of the steering angle from the steering angle sensor 46. The ECU 91 supplies electric power of the battery 93 to the reaction force motor 48 and the steering operation motor 130 to operate these motors. The ECU 91 controls the torque to be generated by the reaction force motor 48 and the rotation amount and torque of the steering operation motor 130, in accordance with the steering angle of the steering wheel 21 (that is, the rotational angle of the steering shaft 32) detected by the steering angle sensor 46, the change rate of the steering angle, and the vehicle speed detected by the speed sensor 92. The ECU 91 controls the rotation amount, rotation speed, and torque of the steering operation motor 130 such that, for example, the steered wheels 180 are steered at a steered angle and a steered speed in accordance with the steering angle and the change rate. The ECU 91 controls the torque of the reaction force motor 48 such that the reaction force increases as the vehicle speed increases, and as the change rate of the steering angle increases, for example. Thus, the driver can steer the right and left steered wheels 180 by operating the steering wheel 21, and feel the weight of the steering wheel 21 to obtain the feeling of steering.

Configuration of Stopper Unit

As described above, in the steering system 10, the steering mechanism 20 and the steering operation mechanism 100 are mechanically separated, so that the rotation range of the steering shaft 32 is not mechanically restricted by the steering operation mechanism 100. Thus, in the steering system 10 according to the present embodiment, the steering mechanism 20 is provided with the stopper unit 41 that mechanically restricts the rotation range of the steering shaft 32. The configuration of the stopper unit 41 will be described with reference to FIGS. 2 to 4.

Figure 2:
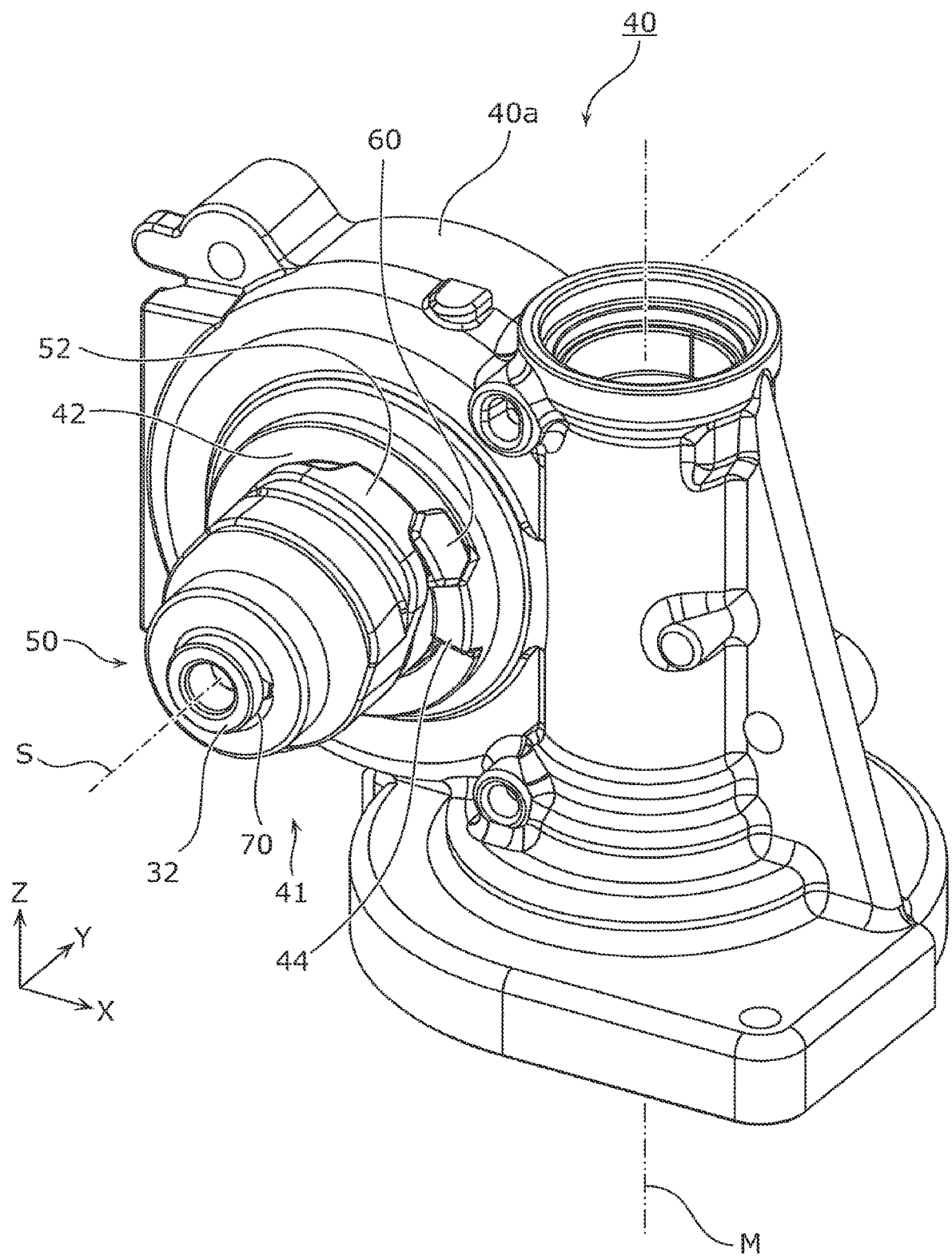
FIG. 2 is a perspective view illustrating the external appearance of a stopper unit and a reducer according to Embodiment 1.
Figure 3:
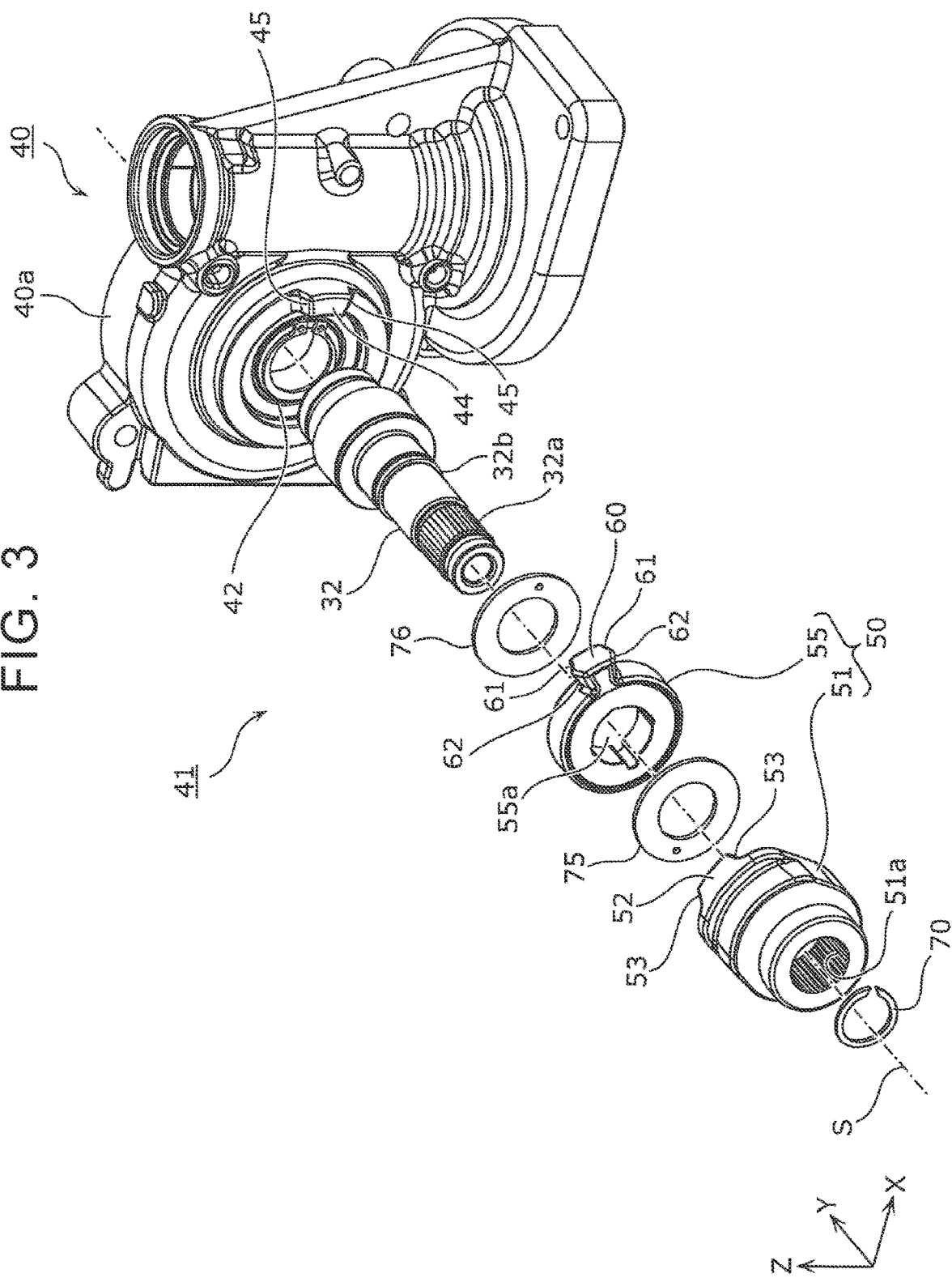
FIG. 3 is an exploded perspective view of the stopper unit according to Embodiment 1.

FIG. 2 is a perspective view illustrating the external appearance of the stopper unit 41 and the reducer 40 according to Embodiment 1. FIG. 3 is an exploded perspective view of the stopper unit 41 according to Embodiment 1. In FIGS. 2 and 3, although the steering shaft 32 includes an upper shaft and a lower shaft, only the lower shaft located on the reducer 40 side is illustrated, and the upper shaft is omitted. The same applies to FIGS. 11 and 12 described below.

Figure 4:
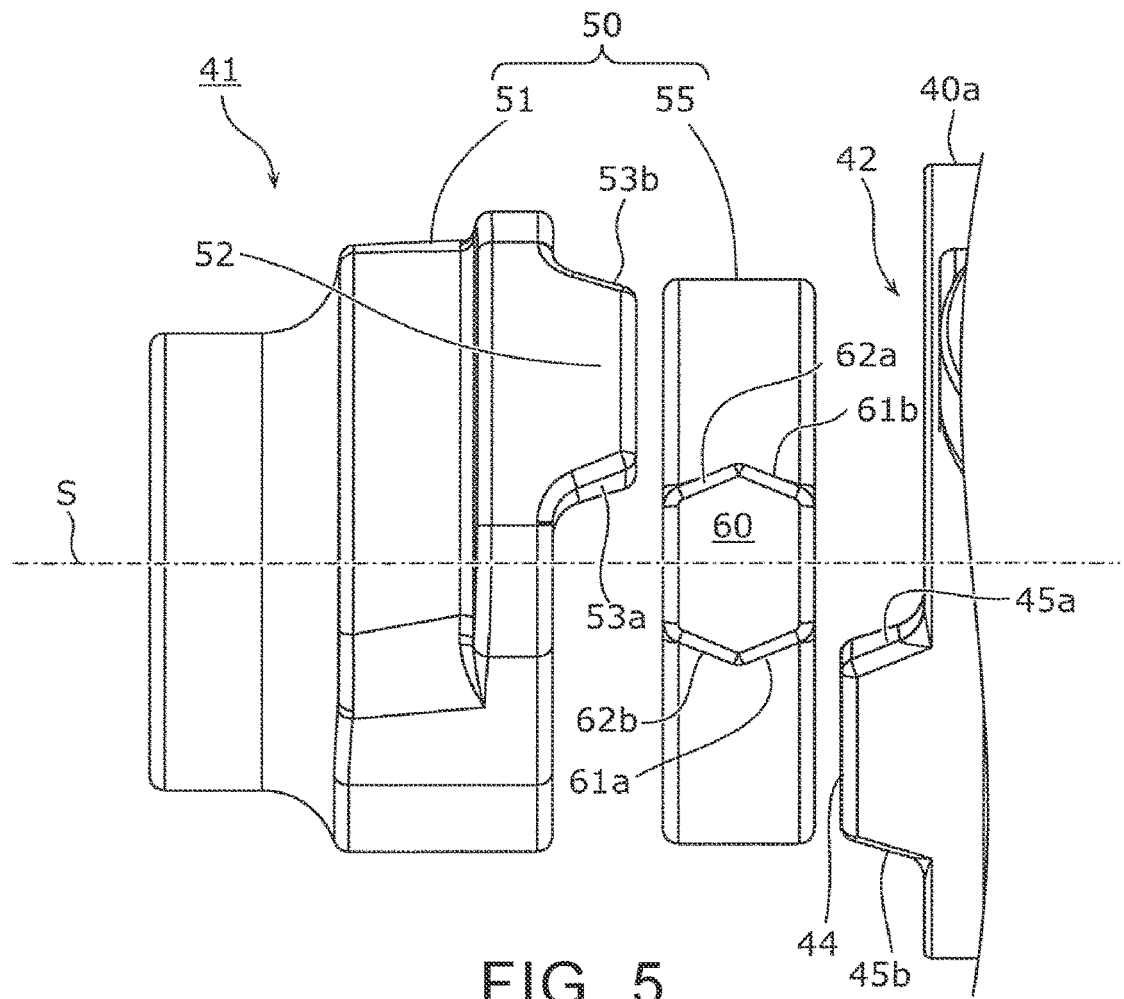
FIG. 4 is a side view illustrating the structural relationship between a rotary member and a stop portion according to Embodiment 1.

FIG. 4 is a side view illustrating the structural relationship between the rotary member 50 and a stop portion 44 according to Embodiment 1. In FIG. 4, only the rotary member 50, and the stop portion 44 of the housing 40a, and the area therearound are illustrated, and other elements such as the steering shaft 32 are omitted. Further, FIG. 4 illustrates the side view of the rotary member 50 as viewed in the projecting direction of a moving portion 60.

As illustrated in FIGS. 2 to 4, the stopper unit 41 according to the present embodiment includes the rotary member 50 attached to the steering shaft 32, and the housing 40a of the reducer 40. The rotary member 50 includes the moving portion 60, and the housing 40a includes the stop portion 44.

The housing 40a of the reducer 40 is an example of a support member, and includes a shaft support portion 42 that rotatably supports the steering shaft 32 extending therethrough. Accordingly, the steering shaft 32 rotates in accordance with the operation of the steering wheel 21 (see FIG. 1). The shaft support portion 42 has, for example, a structure that supports the outer periphery of the steering shaft 32 through a bearing or the like disposed inside the housing 40a, thereby allowing the steering shaft 32 to smoothly rotate about a steering axis S. The steering axis S is a virtual axis representing the rotation axis of the steering shaft 32, and is indicated by a long-dashed short dashed line in FIG. 2 and the subsequent figures. The housing 40a has an opening for insertion of a drive shaft of the reaction force motor 48 (see FIG. 1). The reaction force motor 48 applies torque (that is, reaction force) in the direction opposite to the rotational direction of the steering shaft 32 to the steering shaft 32 through a plurality of gears disposed inside the housing 40a. As mentioned above, the magnitude of reaction force generated by the reaction force motor 48, the timing at which the reaction force is generated, and so on are controlled by the ECU 91. In FIG. 2, a center axis M of the drive shaft of the reaction force motor 48 is indicated by a long dashed double-short dashed line.

The following briefly describes the operation of the stopper unit 41 disposed on the reducer 40 having the above configuration. The moving portion 60 moves in the circumferential direction of the steering shaft 32, in accordance with rotation of the steering shaft 32. After that, the moving portion 60 abuts the stop portion 44 of the housing 40a, so that the movement of the moving portion 60 stops. When the moving portion 60 stops, the rotation of the steering shaft 32 is restricted. That is, the rotation range of the steering shaft 32 is mechanically restricted.

Further, as illustrated in FIGS. 2 to 4, the abutting surface of each of the moving portion 60 and the stop portion 44 is inclined with respect to the direction of the steering axis S (Y-axis direction in the present embodiment, hereinafter simply referred to as an "axial direction"). Specifically, the moving portion 60 includes a first abutting surface 61 that faces the stop portion 44 in the circumferential direction. The first abutting surface 61 is inclined with respect to the axial direction to face the shaft support portion 42 side when the moving portion 60 is viewed in the radial direction of the steering shaft 32 (hereinafter simply referred to as a "radial direction"). The stop portion 44 includes a first abutted surface 45 that abuts the first abutting surface 61. The first abutted surface 45 is inclined with respect to the axial direction to face away from the shaft support portion 42 when the stop portion 44 is viewed in the radial direction.

That is, the normal vector of the first abutting surface 61 has a component directed toward the shaft support portion 42 (component in the Y-axis positive direction). In other words, the first abutting surface 61 is inclined away from the stop portion 44 as the first abutting surface 61 extends toward the shaft support portion 42. The normal vector of the first abutted surface 45 has a component directed away from the shaft support portion 42 (component in the Y-axis negative direction). In other words, the first abutted surface 45 is inclined in the direction parallel to the first abutting surface 61, that is, its abutment counterpart.

In FIG. 4 and the subsequent figures, in order to distinguish two first abutting surfaces 61 of the moving portion 60, one of the first abutting surfaces 61 is referred to as a first abutting surface 61a, and the other one is referred to as a first abutting surface 61b. Likewise, in FIG. 4 and the subsequent drawings, in order to distinguish two first abutted surfaces 45 of the stop portion 44, one of the first abutted surfaces 45 that abuts the first abutting surface 61a is referred to as a first abutted surface 45a, and the other one that abuts the first abutting surface 61b is referred to as a first abutted surface 45b. That is, the first abutted surface 45a is inclined in the direction parallel to the first abutting surface 61a, and the first abutted surface 45b is inclined in the direction parallel to the first abutting surface 61b.

In the present embodiment, the moving portion 60 is disposed on the rotary member 50 attached to the steering shaft 32. Therefore, when the rotary member 50 rotates, the moving portion 60 can move in the circumferential direction (rotate about the steering axis S) in accordance with the rotation.

More specifically, in the present embodiment, as illustrated in FIGS. 3 and 4, the rotary member 50 includes a first rotary member 51 supported on the steering shaft 32 so as not to be relatively rotatable with respect thereto, and a second rotary member 55 supported on the steering shaft 32 so as to be relatively rotatable with respect thereto. As illustrated in FIGS. 3 and 4, the moving portion 60 is fixed to the second rotary member 55. Specifically, a portion projecting in the radial direction from the outer periphery of the second rotary member 55 serves as the moving portion 60. Further, as illustrated in FIGS. 2 to 4, the first rotary member 51 includes a projecting portion 52 projecting toward the second rotary member 55. When the first rotary member 51 rotates, the projecting portion 52 abuts the moving portion 60 of the second rotary member 55. Specifically, the projecting portion 52 of the first rotary member 51 includes a second abutting surface 53 inclined with respect to the axial direction, and the second abutting surface 53 is inclined in the same direction as the first abutting surface 61. The moving portion 60 of the second rotary member 55 includes a second abutted surface 62 that is inclined with respect to the axial direction and that abuts the second abutting surface 53. The second abutted surface 62 is inclined in the same direction as the first abutted surface 45.

More specifically, the projecting portion 52 of the first rotary member 51 includes two second abutting surfaces 53. In FIG. 4 and the subsequent figures, in order to distinguish the two second abutting surfaces 53, one of the second abutting surfaces 53 is referred to as a second abutting surface 53a, and the other one is referred to as a second abutting surface 53b. The moving portion 60 of the second rotary member 55 includes two second abutted surfaces 62. In FIG. 4 and the subsequent figures, in order to distinguish the two second abutted surfaces 62, one of the second abutted surfaces 62 is referred to as a second abutted surface 62a, and the other one is referred to as a second abutted surface 62b. In this case, as is understood from FIG. 4, the second abutting surface 53a of the projecting portion 52 and the second abutted surface 62a of the moving portion 60 abut each other. The second abutting surface 53a is inclined in the same direction as the first abutting surface 61a, and the second abutted surface 62a is inclined in the same direction as the first abutted surface 45a. The second abutting surface 53b of the projecting portion 52 and the second abutted surface 62b of the moving portion 60 abut each other. The second abutting surface 53b is inclined in the same direction as the first abutting surface 61b, and the second abutted surface 62b is inclined in the same direction as the first abutted surface 45b.

The first rotary member 51 having the above configuration is attached to the steering shaft 32 so as to be engaged therewith in the circumferential direction. Specifically, an external spline 32a having a plurality of protrusions extending in the axial direction is formed on the outer periphery at the end of the steering shaft 32 extending out of the housing 40a. Further, an internal spline 51a that fits to the external spline 32a is formed on the inner periphery of the cylindrical first rotary member 51. That is, when the external spline 32a of the steering shaft 32 is inserted into the first rotary member 51, the first rotary member 51 is movable with respect to the steering shaft 32 in the axial direction, and is engaged with the steering shaft 32 in the circumferential direction. That is, the first rotary member 51 is supported on the steering shaft 32 so as not to be relatively rotatable with respect thereto.

The second rotary member 55 with the steering shaft 32 extending therethrough is disposed on the shaft support portion 42 side of the first rotary member 51. Specifically, the steering shaft 32 extends through an opening 55a of the second rotary member 55 to support the second rotary member 55, and the second rotary member 55 is relatively rotatable with respect to the steering shaft 32. The steering shaft 32 includes a step portion 32b having an outside diameter greater than the inner diameter of the opening 55a to prevent interference between the second rotary member 55 and the housing 40a. A biasing member 70 serving as a retainer that prevents the rotary member 50 from coming off and that biases the rotary member 50 toward the shaft support portion 42 is disposed at the distal end of the steering shaft 32. The biasing member 70 will be described below with reference to FIGS. 9 and 10.

The stopper unit 41 further includes a slide plate 75 and a slide plate 76 made of, for example, resin. The slide plate 75 is disposed between the first rotary member 51 and the second rotary member 55, and the slide plate 76 is disposed between the second rotary member 55 and the step portion 32b of the steering shaft 32. This allows the first rotary member 51 and the second rotary member 55 to rotate smoothly.

Exemplary Operation of Stopper Unit

The exemplary operation of the stopper unit 41 having the above configuration will be described with reference to FIGS. 5 to 8. FIGS. 5 to 8 are first to fourth diagrams illustrating an exemplary operation of the stopper unit 41 according to Embodiment 1.

Figure 5:
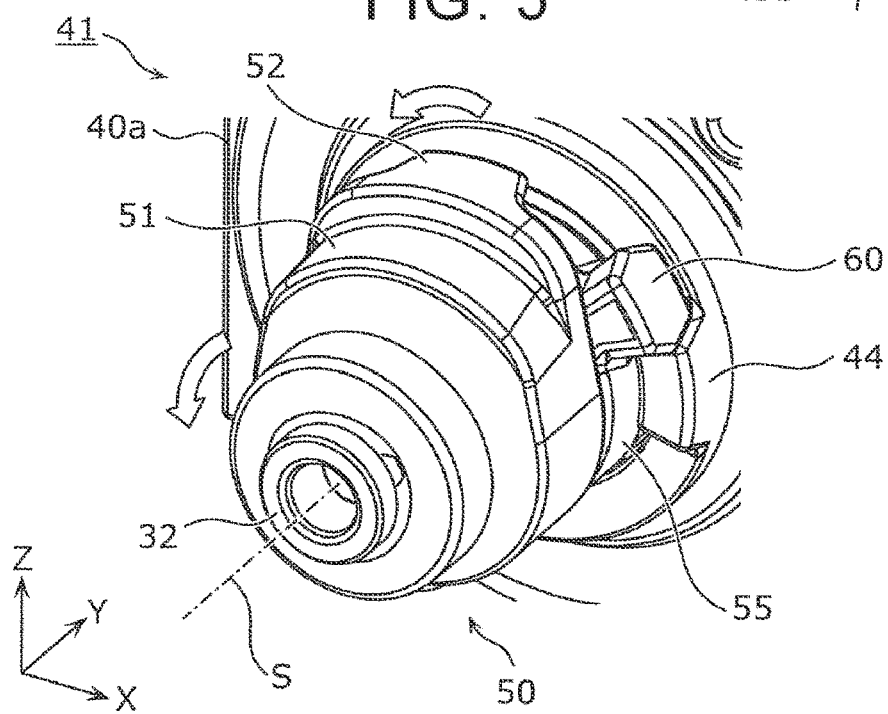
FIG. 5 is a first diagram illustrating an exemplary operation of a stopper unit according to Embodiment 1.

For example, assume that the steering shaft 32 is rotated counterclockwise as viewed from the front (as the stopper unit 41 is viewed from the Y-axis negative side, the same applies to the below), from the position illustrated in FIG. 2 in which the stopper unit 41 is in the initial state. In this case, the first rotary member 51 fixed to the steering shaft 32 starts to rotate counterclockwise together with the steering shaft 32 as illustrated in FIG. 5. Thus, the projecting portion 52 of the first rotary member 51 temporarily moves away from the moving portion 60.

Figure 6:
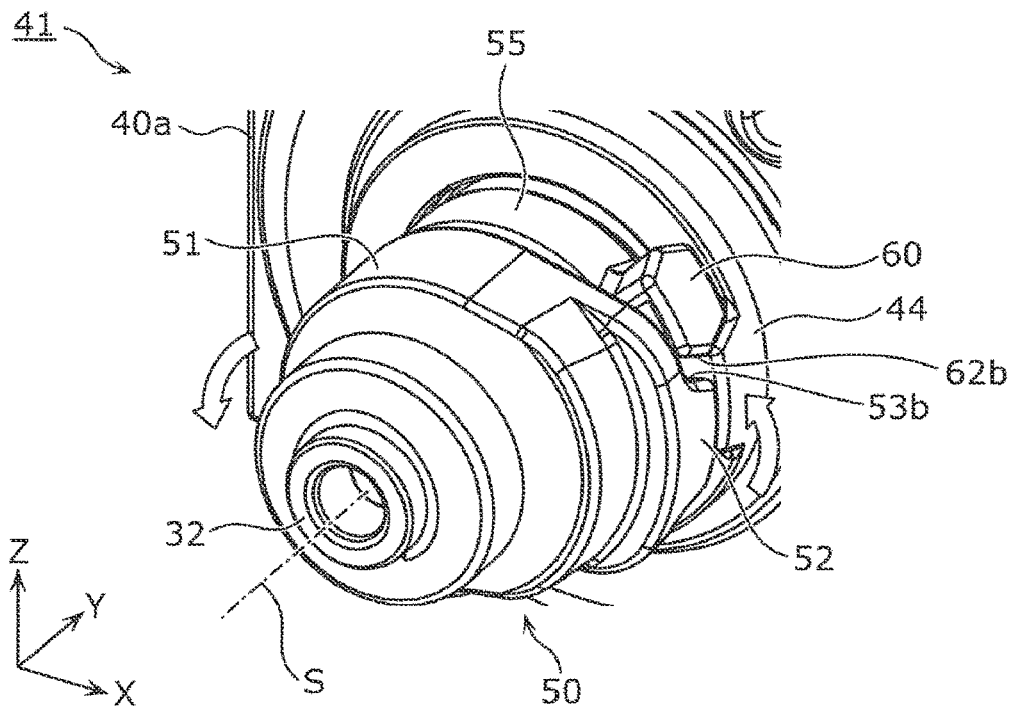
FIG. 6 is a second diagram illustrating an exemplary operation of the stopper unit according to Embodiment 1.
Figure 7:
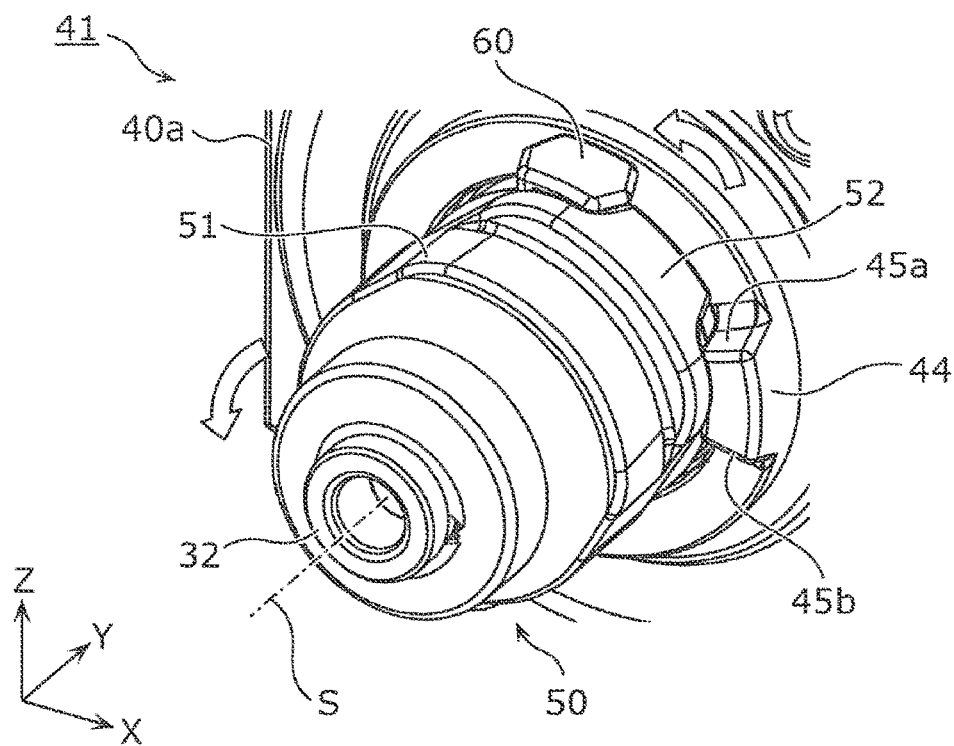
FIG. 7 is a third diagram illustrating an exemplary operation of the stopper unit according to Embodiment 1.

After that, the rotation of the steering shaft 32 continues, so that the projecting portion 52 moves toward the moving portion 60 as illustrated in FIG. 6. In this step, because the projecting portion 52 has the shape and size that do not cause interference with the stop portion 44 fixed to the housing 40a, the movement of the projecting portion 52 is not directly restricted by the stop portion 44. That is, the projecting portion 52 passes through the front side (Y-axis negative side) of the stop portion 44, so that the second abutting surface 53b of the projecting portion 52 abuts the second abutted surface 62b of the moving portion 60. Further, the projecting portion 52 pushes the moving portion 60 in the circumferential direction, so that the second rotary member 55 rotates with the first rotary member 51 while the second abutting surface 53b is maintained in abutment with the second abutted surface 62b as illustrated in FIG. 7. Thus, the moving portion 60 temporarily moves away from the stop portion 44.

Figure 8:
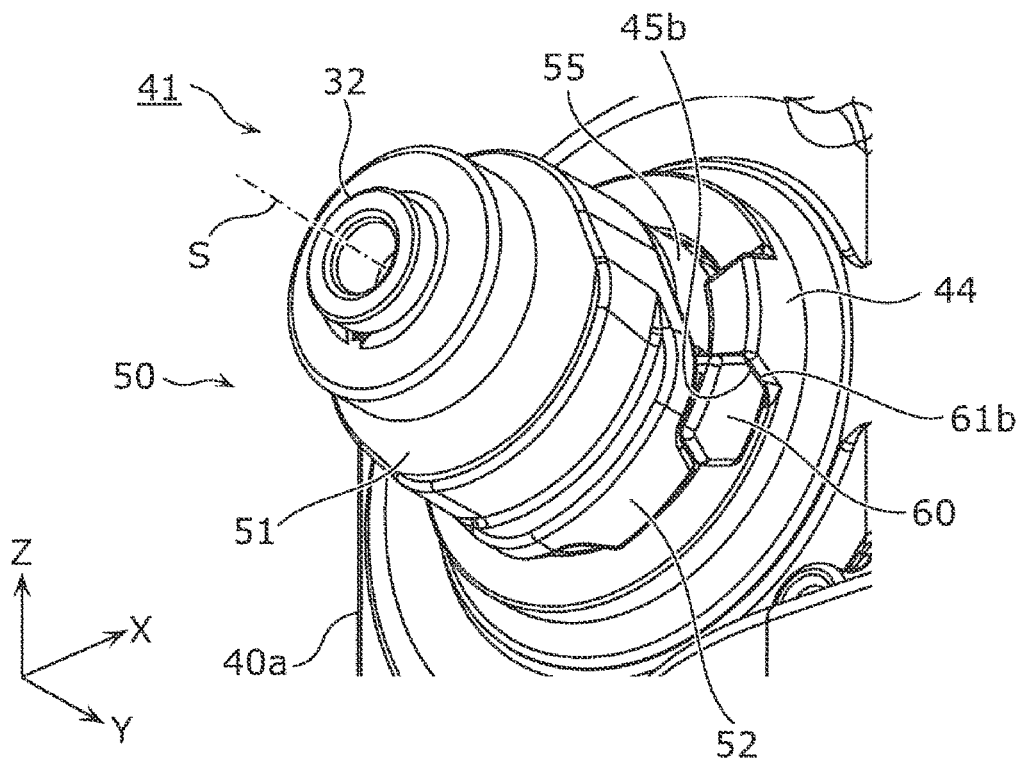
FIG. 8 is a fourth diagram illustrating an exemplary operation of the stopper unit according to Embodiment 1.

Subsequently, the rotation of the steering shaft 32 continues, so that the moving portion 60 moves toward the stop portion 44, and eventually stops upon abutting the stop portion 44 as illustrated in FIG. 8. Specifically, the first abutting surface 61b of the moving portion 60 abuts the first abutted surface 45b of the stop portion 44, so that the movement of the moving portion 60 stops. That is, the counterclockwise rotation of the rotary member 50 is restricted, and the counterclockwise rotation of the steering shaft 32 that is not relatively rotatable with respect to the rotary member 50 is also restricted. Further, when the steering shaft 32 rotates clockwise from the position of FIG. 8, the projecting portion 52 of the first rotary member 51 makes about one clockwise turn, and passes through the front side of the stop portion 44. Then, the second abutting surface 53a of the projecting portion 52 abuts the second abutted surface 62a of the moving portion 60, so that the first rotary member 51 rotates clockwise with the second rotary member 55 while maintaining the abutment therebetween. Thus, the moving portion 60 temporarily moves away from the stop portion 44. After that, the moving portion 60 moves toward the stop portion 44, and eventually the first abutting surface 61a of the moving portion 60 abuts the first abutted surface 45a of the stop portion 44, so that the movement of the moving portion 60 stops. That is, the stopper unit 41 returns to the state illustrated in FIG. 2, so that the clockwise rotation of the steering shaft 32 is restricted. In this manner, in the present embodiment, the stopper unit 41 can mechanically restrict the rotation range of the steering shaft 32. In the present embodiment, the upper limit of the rotation range is one and a half turns or more and less than two turns. Further, in the structure capable of mechanically restricting the rotation range of the steering shaft 32 in the manner described above, since the first abutting surface 61 and the first abutted surface 45 are inclined so as to release the impact of abutment therebetween, the risk of damage to the moving portion 60 and the stop portion 44 is reduced. The effect of reducing the risk of damage will be described below.

Configuration of Biasing Member

As described above, in the steering apparatus 30 according to the present embodiment, a plurality of members are arranged in the axial direction with the steering shaft 32 extending therethrough. These members do not have portions for fixing their axial positions on the steering shaft 32. Accordingly, in the present embodiment, a biasing member 70 serving as a retainer that prevents the plurality of members from coming off from the steering shaft 32 is disposed at the distal end of the steering shaft 32. The biasing member 70 will be described with reference to FIGS. 9 and 10.

Figure 9:
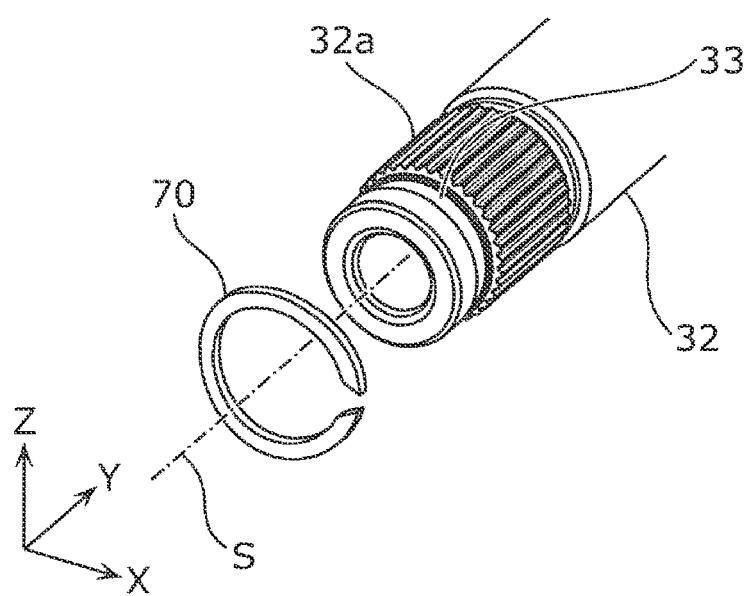
FIG. 9 is a perspective view illustrating the external appearance of a biasing member according to Embodiment 1.
Figure 10:
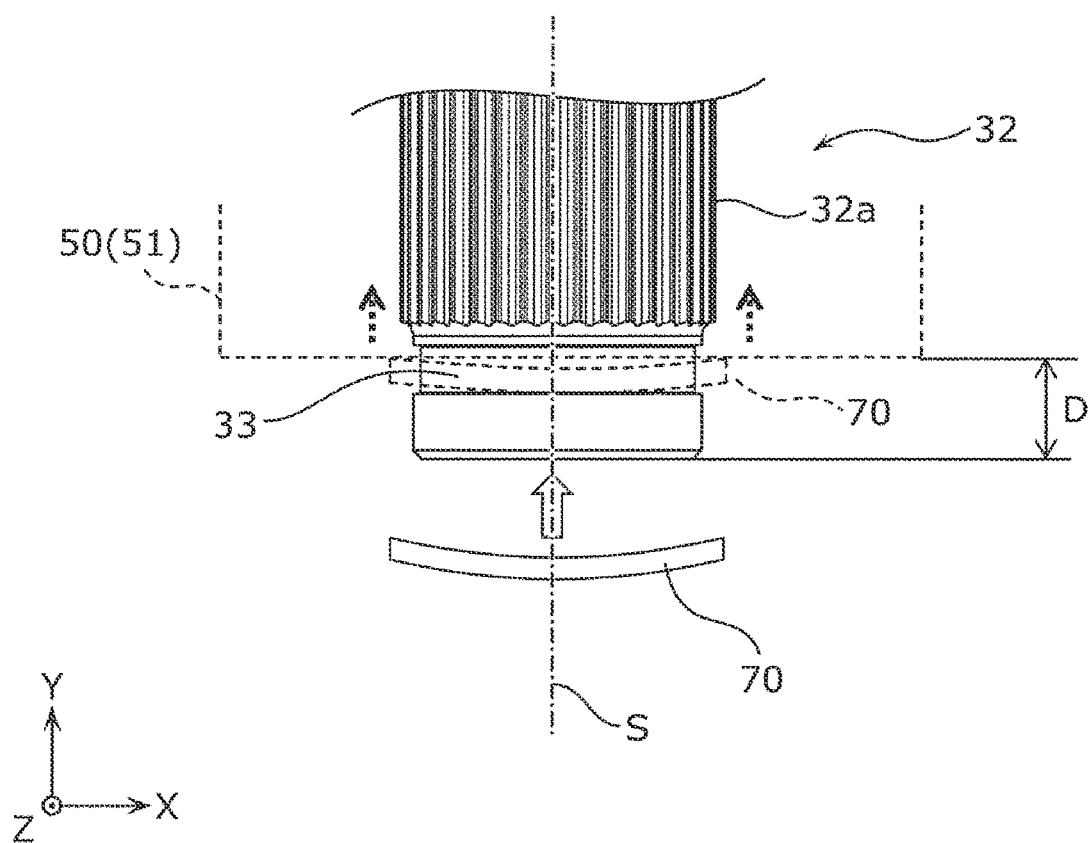
FIG. 10 is a plan view illustrating that the biasing member according to Embodiment 1 has an arcuate shape.

FIG. 9 is a perspective view illustrating the external appearance of the biasing member 70 according to Embodiment 1, and FIG. 10 is a plan view illustrating that the biasing member 70 according to Embodiment 1 has an arcuate shape. In FIGS. 9 and 10, the biasing member 70 is detached from the steering shaft 32.

As illustrated in FIGS. 9 and 10, the biasing member 70 is a partially cut-off annular member made of, for example, spring steel. The biasing member 70 is, for example, a so-called C-shaped snap ring. The biasing member 70 is attached to the distal end of the steering shaft 32 extending out of the first rotary member 51 after arranging the slide plate 76, the second rotary member 55, the slide plate 75, and the first rotary member 51 on the steering shaft 32. Specifically, an attachment groove 33 in which the biasing member 70 is attached is formed in the outer periphery of the distal end of the steering shaft 32. The biasing member 70 is expanded to have a greater inner diameter so as to be attached to the attachment groove 33, and then returns to the original shape with its restoring force. The biasing member 70 has an arcuate shape as illustrated in FIG. 10, and therefore can bias the first rotary member 51 toward the shaft support portion 42 (see FIG. 3) when attached to the attachment groove 33. Movement of the slide plate 76 toward the shaft support portion 42 is restricted by the step portion 32b (see FIG. 3) of the steering shaft 32. As a result, the first rotary member 51, the slide plate 75, the second rotary member 55, and the slide plate 76 are biased toward the shaft support portion 42 in the axial direction by the elastic force of the biasing member 70. Accordingly, these four members are prevented by the biasing member 70 from coming off from the steering shaft 32, and the risk of gap formation between adjacent members is reduced.

Advantageous Effects

As described above, the steering apparatus 30 according to the present embodiment is a vehicle steering apparatus provided in the steering mechanism 20 mechanically separated from the steering operation mechanism 100. The steering apparatus 30 includes: the steering shaft 32 that rotates in accordance with an operation on the steering wheel 21; the moving portion 60 that moves in the circumferential direction of the steering shaft 32 in accordance with rotation of the steering shaft 32, and restricts the rotation of the steering shaft 32 when the movement is stopped; the housing 40a including the shaft support portion 42 that relatively rotatably supports the steering shaft 32; and the stop portion 44 that is disposed on the housing 40a and abuts the moving portion 60 to stop the movement of the moving portion 60. The moving portion 60 includes the first abutting surface 61 that faces the stop portion 44 in the circumferential direction. The first abutting surface 61 is inclined with respect to the axial direction to face the shaft support portion 42 side when the moving portion 60 is viewed in the radial direction. The stop portion 44 includes the first abutted surface 45 that abuts the first abutting surface 61.

More specifically, the first abutted surface 45 is inclined with respect to the axial direction to face away from the shaft support portion 42 when the stop portion 44 is viewed in the radial direction. That is, in the present embodiment, the first abutted surface 45 is inclined in the direction parallel to the first abutting surface 61 so as to come into surface-abutment with the first abutting surface 61.

In this manner, in the steering apparatus 30 according to the present embodiment, the rotation range of the steering shaft 32 can be mechanically restricted by causing the moving portion 60 that rotates in accordance with rotation of the steering shaft 32 to abut the stop portion 44 fixed to the housing 40a. Specifically, the first abutting surface 61 of the moving portion 60 and the first abutted surface 45 of the stop portion 44 abut each other. The first abutting surface 61 and the first abutted surface 45 are inclined with respect to the axial direction of the steering shaft 32 so as not to come into a so-called head-on collision when abutting each other. More specifically, the first abutting surface 61 that faces the stop portion 44 in the circumferential direction is inclined away from the stop portion 44 as the first abutting surface 61 extends toward the shaft support portion 42. Accordingly, when the first abutting surface 61 and the first abutted surface 45 abut each other in the circumferential direction, part of the force applied from the stop portion 44 to the first abutting surface 61 acts as a force that pushes the moving portion 60 to the front side in the axial direction (Y-axis negative side). As a result, concentration of stress on the proximal end of the moving portion 60 upon abutment with the stop portion 44 is reduced, so that the risk of damage due to the stress concentration is reduced. In the case of the first abutted surface 45 as well, part of the force applied from the moving portion 60 to the first abutted surface 45 acts as a force that pushes the stop portion 44 to the rear side in the axial direction (Y-axis positive side). As a result, concentration of stress on the proximal end of the stop portion 44 upon abutment with the moving portion 60 is reduced, so that the risk of damage due to the stress concentration is reduced.

Further, for example, the impact energy upon abutment between the moving portion 60 and the stop portion 44 is easily absorbed by other members such as the housing 40a on which the stop portion 44 is disposed, so that the level of metal-on-metal hammering sound generated by abutment (collision) between the moving portion 60 and the stop portion 44 is reduced.

Further, the moving portion 60 can be attached to the steering shaft 32, for example, directly or through a member attached to the steering shaft 32. The stop portion 44 is fixed to the housing 40a serving as a member that supports the steering shaft 32. That is, the stopper unit 41 serving as a mechanism for restricting the rotation range of the steering shaft 32 can be compactly disposed in an area near the steering shaft 32. Accordingly, the size or weight of the steering apparatus 30 can easily be reduced. Further, since the stopper unit 41 has a simple configuration, problems such as a failure of the stopper unit 41 are less likely to occur.

Thus, the steering apparatus 30 according to the present embodiment is a vehicle steering apparatus with a simple configuration and high reliability.

Only one of the first abutting surface 61 and the first abutted surface 45 that abut each other may be inclined with respect to the axial direction. That is, only one of the first abutting surface 61 and the first abutted surface 45 may be inclined such that part of the force received from the abutment counterpart upon abutment is directed away from the abutment counterpart in the axial direction. For example, in FIG. 4, the first abutting surface 61a may be inclined with respect to the axial direction to face the shaft support portion 42 side, and the first abutted surface 45a of the stop portion 44 may be formed parallel to the axial direction. Even in this case, the first abutting surface 61a does not come into a so-called head-on collision upon abutting the first abutted surface 45a, and part of the force applied from the stop portion 44 to the first abutting surface 61a acts as a force that pushes the moving portion 60 to the front side in the axial direction (Y-axis negative side). As a result, concentration of stress on the proximal end of each of the moving portion 60 and the stop portion 44 is reduced, so that the risk of damage due to the stress concentration is reduced.

Note that in the case where the first abutted surface 45 is inclined in the direction parallel to the first abutting surface 61 so as to come into surface-abutment with the first abutting surface 61 as in the present embodiment, greater advantages are obtained in terms of improving the effect of dispersing the impact due to increased abutment area, or improving the reliability in stopping the moving portion 60 by the stop portion 44.

Further, in the present embodiment, the moving portion 60 is fixed to the rotary member 50 that is attached to the steering shaft 32 and that rotates about the steering shaft 32 in accordance with rotation of the steering shaft 32.

That is, in the present embodiment, by attaching the rotary member 50 with the moving portion 60 disposed thereon to the steering shaft 32, the moving portion 60 that moves in the circumferential direction in accordance with rotation of the steering shaft 32 can be arranged on the steering shaft 32. Therefore, for example, the axial position of the moving portion 60 can be changed by changing the axial position of the rotary member 50 on the steering shaft 32. Further, for example, the shape or the radial position of the moving portion 60 can be changed by replacing the rotary member 50 with a rotary member 50 having a different shape. That is, the position and shape of the moving portion 60 disposed on the steering shaft 32 are easily changed.

As described above, since the first abutting surface 61 is inclined away from the stop portion 44 as the first abutting surface 61 extends toward the shaft support portion 42, a force that pushes the moving portion 60 to the front side in the axial direction is applied to the moving portion 60 when abutting the first abutted surface 45 of the stop portion 44. Thus, the axial position of the rotary member 50 may be shifted away from the shaft support portion 42. However, both the first abutting surface 61 and the first abutted surface 45 are surfaces of metal bodies, and a static frictional force is applied when abutting each other. This static frictional force has a component that pulls the first abutting surface 61 to the rear side in the axial direction, and therefore can cancel out at least part of the force that pushes the moving portion 60 to the front side in the axial direction. Accordingly, although the first abutting surface 61 and the first abutted surface 45 are inclined as described above, the position of the rotary member 50 is not shifted to the front side in the axial direction.

Further, in the present embodiment, the rotary member 50 includes the first rotary member 51 and the second rotary member 55. The first rotary member 51 is attached to the steering shaft 32 so as to be engaged therewith in the circumferential direction of the steering shaft 32. The second rotary member 55 is relatively rotatably supported on the steering shaft 32, and rotates in accordance with rotation of the first rotary member 51 when abutting the first rotary member 51 in the circumferential direction. The moving portion 60 is fixed to the second rotary member 55. The first rotary member 51 includes the second abutting surface 53 inclined with respect to the axial direction of the steering shaft 32. The second abutting surface 53 is inclined in the same direction as the first abutting surface 61. The second rotary member 55 includes the second abutted surface 62 that is inclined with respect to the axial direction and that abuts the second abutting surface 53. The second abutted surface 62 is inclined in the same direction as the first abutted surface 45.

For example, as illustrated in FIG. 4, the first rotary member 51 includes the second abutting surface 53a inclined in the same direction as the first abutting surface 61a, and the second rotary member 55 includes the second abutted surface 62a inclined in the same direction as the first abutted surface 45a. The second abutting surface 53a abuts the second abutted surface 62a.

With this configuration, in the rotary member 50, the first rotary member 51 that rotates with the steering shaft 32 and the second rotary member 55 that includes the moving portion 60 are rotatable independently of each other. Further, the first rotary member 51 can rotate in association with the second rotary member 55. Therefore, as illustrated, for example, in FIGS. 5 to 8, only the first rotary member 51 can be rotated in a position that does not interfere with the stop portion 44, and the moving portion 60 of the second rotary member 55 that rotates with the first rotary member 51 can be brought into abutment with the stop portion 44. Accordingly, the rotation range of the steering shaft 32 is increased, compared to the case where the entire rotary member 50 rotates with the steering shaft 32 to cause the moving portion 60 fixed to the rotary member 50 to abut the stop portion 44. This increases, for example, the degree of freedom in the rotation range of the steering shaft 32 that is restricted in the steering apparatus 30.

Similar to the first abutting surface 61 of the moving portion 60 and the first abutted surface 45 of the stop portion 44, the second abutting surface 53 of the projecting portion 52 and the second abutted surface 62 of the moving portion 60 are inclined such that part of the force applied from the abutment counterpart upon abutment is directed away from the abutment counterpart in the axial direction. This reduces the risk of damage to the projecting portion 52 and the moving portion 60 due to abutment between the projecting portion 52 and the moving portion 60. As for the second abutting surface 53 and the second abutted surface 62 that abut each other, as in the case of the first abutting surface 61 and the first abutted surface 45, only one of the these surfaces may be inclined with respect to the axial direction. Even in this case, the risk of damage to the projecting portion 52 and the moving portion 60 is reduced, compared to the case where both the second abutting surface 53 and the second abutted surface 62 are parallel to the axial direction.

In the present embodiment, for example, the second abutted surface 62a of the second rotary member 55 is formed on the moving portion 60 as illustrated in FIG. 4. The distance (radial position) of the second abutted surface 62a from the steering axis S is the same as that of the first abutting surface 61a also formed on the moving portion 60. That is, the second abutting surface 53a of the first rotary member 51, the second abutted surface 62a and the first abutting surface 61a of the moving portion 60, and the first abutted surface 45a of the stop portion 44 are arranged in the circumferential direction of the steering shaft 32 when viewed from the front. Accordingly, when the second abutting surface 53a of the first rotary member 51 abuts the second abutted surface 62a of the moving portion 60, and the first abutting surface 61a of the moving portion 60 abuts the first abutted surface 45a of the stop portion 44, the resisting force of the stop portion 44 against the pressing force of the second abutting surface 53a is effectively applied to the second abutting surface 53a. As a result, the stop portion 44 can stably stop rotation of the first rotary member 51, so that an operation for stopping rotation of the steering shaft 32 can be stably performed.

The steering apparatus 30 according to the present embodiment further includes the biasing member 70 that is attached to the steering shaft 32. The biasing member 70 biases the rotary member 50 toward the shaft support portion 42 in the axial direction.

With this configuration, for example, even when vibration is applied to the steering apparatus 30, a gap is not easily formed between the rotary member 50 and another member adjacent to the rotary member 50, so that a hammering sound due to, for example, contact between the rotary member 50 and another member in the axial direction is not easily generated. Further, even when the rotary member 50 includes a plurality of members separated in the axial direction (in the present embodiment, members such as the first rotary member 51 and the second rotary member 55), a gap is not easily formed between the plurality of members. Accordingly, a hammering sound is less likely to be generated in the rotary member 50.

Further, for example, since a gap is not easily formed between the members, the risk of troubles (generation of abnormal noise, increase in torque required to rotate the rotary member 50, and so on) due to entrance of foreign matter into a gap is reduced.

More specifically, in the present embodiment, as described above, four members of the first rotary member 51, the slide plate 75, the second rotary member 55, and the slide plate 76 are disposed on the steering shaft 32, and these four members are biased toward the shaft support portion 42 by the biasing member 70. Accordingly, if a member required for assembly, such as the slide plate 75, is missing, it is possible to detect that a member is missing by measuring a distance D (see FIG. 10) from the distal end surface of the steering shaft 32 to the rotary member 50. That is, if at least one of a plurality of required members to be disposed between the biasing member 70 and the shaft support portion 42 (housing 40a) is missing, the distance D is less than the normal value. Thus, it is possible to detect that a member is missing. Further, the distance D can be measured, for example, by analyzing the image data of the distal end of the steering shaft 32, or by measuring using a laser range finder, and therefore it is possible to automatically detect whether there is a missing member.

Further, in the present embodiment, a C-shaped arcuate snap ring is used as the biasing member 70. Therefore, it is easy to install the rotary member 50 and other members on the steering shaft 32, that is, to assemble the stopper unit 41.

Further, as described above, the first abutting surface 61 and the first abutted surface 45 are inclined with respect to the axial direction, and therefore the rotary member 50 may attempt to move to the front side in the axial direction upon abutment of these surfaces. Even in this case, the movement is prevented by the biasing member 70 biasing to the opposite side (rear side in the axial direction).

An element for fixing the rotary member 50 (more specifically, the first rotary member 51) to the steering shaft 32 so as to prevent axial movement of the rotary member 50 with respect to the steering shaft 32 is not limited to the biasing member 70. For example, a rotary member may be formed in a C-shape, and may be fixed to the steering shaft 32 by fastening the ends of the rotary member facing each other in the circumferential direction with a bolt inserted in the direction orthogonal to the steering axis S.

However, in this case, a step of fastening with a bolt and a nut is required, so that the assembly of the stopper unit 41 is more complicated. Moreover, the weight of the steering apparatus 30 is increased due to the use of a bolt and a nut. Further, if a bolt and a nut are used, the axial position of the rotary member on the steering shaft 32 is substantially completely fixed. Therefore, for example, even in the case where the rotary member is fixed without a gap between the rotary member and another member adjacent to the rotary member at the time of assembly, a gap may be formed between the rotary member and the other member due to heat shrinkage, etc. of the rotary member and the other member during use of the steering apparatus 30.

Meanwhile, in the present embodiment, the biasing member 70 is used to bias the rotary member 50 toward the shaft support portion 42. Therefore, even when any of the members including the rotary member 50 is moved or deformed to form a gap between its adjacent member, the biasing force of the biasing member 70 is applied to the member to eliminate the gap. Also, even if any of the members including the rotary member 50 is moved or deformed to press its adjacent member, the biasing member 70 is elastically deformed, thereby reducing generation of excessive pressing force due to the movement or deformation. Accordingly, use of the biasing member 70 is advantageous in terms of reducing the weight of the stopper unit 41, simplifying the assembly process, and reducing the risk of gap formation between the members.

Embodiment 2

In Embodiment 2, the configuration of a stopper unit 41a including a rotary member 150 that operates as a single unit will be described with focus on the differences from Embodiment 1.

Figure 11:
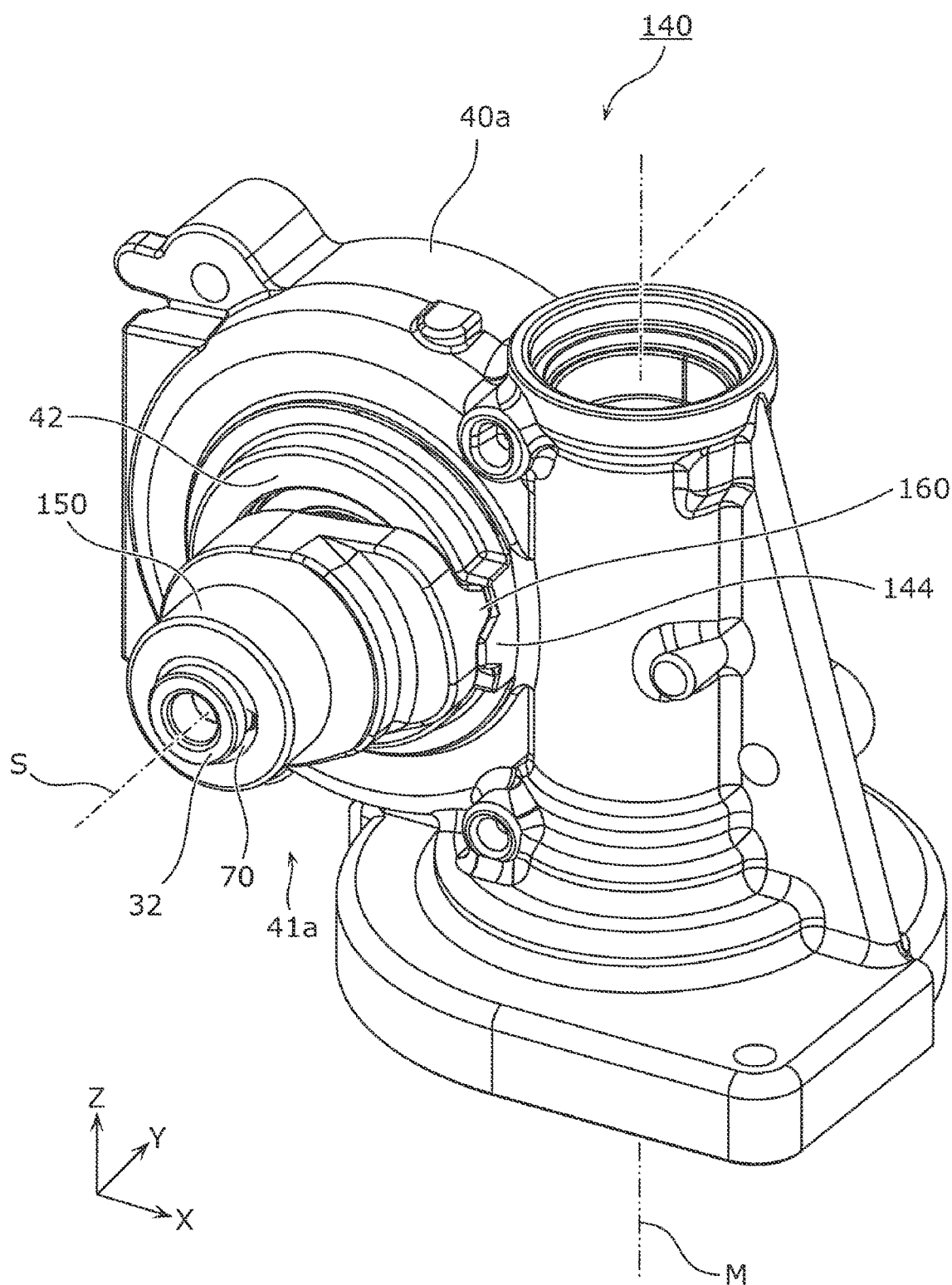
FIG. 11 is a perspective view illustrating the external appearance of a stopper unit and a reducer according to Embodiment 2.
Figure 12:
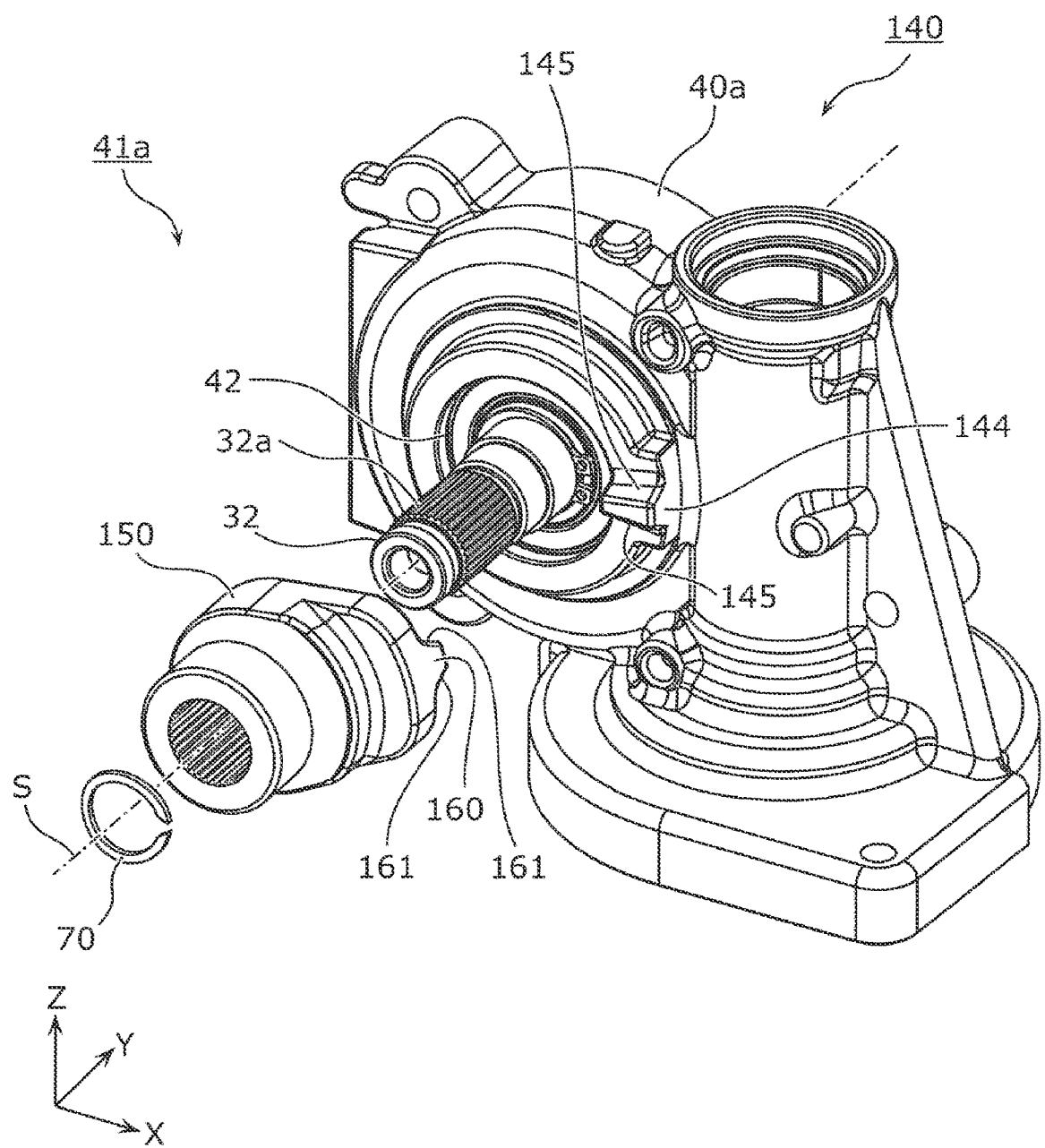
FIG. 12 is an exploded perspective view of the stopper unit according to Embodiment 2.

FIG. 11 is a perspective view illustrating the external appearance of the stopper unit 41a and a reducer 140 according to Embodiment 2. FIG. 12 is an exploded perspective view of the stopper unit 41a according to Embodiment 2. The stopper unit 41a of the present embodiment is a device that may be included in the steering apparatus 30 in place of the stopper unit 41 of Embodiment 1.

Specifically, as illustrated in FIGS. 11 and 12, the stopper unit 41a includes: a moving portion 160 that moves in the circumferential direction of the steering shaft 32 in accordance with rotation of the steering shaft 32, and restricts the rotation of the steering shaft 32 when the movement is stopped; a housing 40*a* including a shaft support portion 42; and a stop portion 144 that is disposed on the housing 40*a*, and abuts the moving portion 160 to stop the movement of the moving portion 160. The moving portion 160 includes a first abutting surface 161 that faces the stop portion 144 in the circumferential direction. The first abutting surface 161 is inclined with respect to the axial direction to face the shaft support portion 42 side when the moving portion 160 is viewed in the radial direction. The stop portion 144 includes a first abutted surface 145 that abuts the first abutting surface 161. The first abutted surface 145 is inclined with respect to the axial direction to face away from the shaft support portion 42 when the stop portion 144 is viewed in the radial direction.

That is, the stopper unit 41*a* of the present embodiment has the same basic configuration as the stopper unit 41 of Embodiment 1. Accordingly, as in the case of the stopper unit 41 of Embodiment 1, it is possible to mechanically restrict the rotation range of the steering shaft 32 through abutment of the moving portion 160 against the stop portion 144, and to reduce the risk of damage to the moving portion 160 and the stop portion 144. It is also possible to achieve advantageous effects such as a reduction in size or weight of the steering apparatus 30.

As for the first abutting surface 161 and the first abutted surface 145 in the stopper unit 41*a* of the present embodiment, as in the case of the stopper unit 41 of Embodiment 1, only one of these surfaces may be inclined with respect to the axial direction. Even in this case, the first abutting surface 161 does not come into a so-called head-on collision when abutting the first abutted surface 145. As a result, for example, concentration of stress on the proximal end of each of the moving portion 160 and the stop portion 144 is reduced, so that the risk of damage due to the stress concentration is reduced.

Further, the stopper unit 41*a* is similar to the stopper unit 41 in that the moving portion 160 is fixed to the rotary member 150 attached to the steering shaft 32, and that the rotary member 150 is biased toward the shaft support portion 42 by the biasing member 70. Accordingly, the advantageous effects achieved with these configurations described in Embodiment 1 can also be achieved in the present embodiment.

The stopper unit 41*a* of the present embodiment is different from the stopper unit 41 of the above Embodiment 1 in that the entire rotary member 150 rotates with rotation of the steering shaft 32.

That is, when the steering shaft 32 makes one turn, the entire rotary member 150 makes one turn in accordance with that turn. Consequently, the moving portion 160 also makes one turn. Thus, the rotation range of the steering shaft 32 is mechanically restricted, and the upper limit of the rotation range is less than one turn. Accordingly, with the stopper unit 41*a* of the present embodiment, the rotation range of the steering shaft 32 is reduced as compared to the case with the stopper unit 41 of Embodiment 1. However, the stopper unit 41*a* is more advantageous than the stopper unit 41 of Embodiment 1 in terms of simplifying the configuration and reducing the size and weight of the stopper unit 41.

OTHER EMBODIMENTS

Although the steering apparatus according to the present disclosure has been described according to Embodiments 1 and 2, the present disclosure is not limited thereto. Modifications apparent to those skilled in the art may be made to Embodiments 1 and 2, and the features of Embodiments 1 and 2 may be combined to form further embodiments without departing from the scope of the present disclosure. All of these embodiments are considered within the scope of the present disclosure.

For instance, in Embodiment 1, as illustrated, for example, in FIG. 4, the first abutting surface 61*a* of the moving portion 60 and the first abutted surface 45*a* of the stop portion 44 are both flat, and come into surface-abutment. However, the shape of the first abutting surface 61*a* and the first abutted surface 45*a* are not limited to the flat shape. For example, if the first abutting surface 61*a* has an outwardly curved shape, the first abutted surface 45*a* may have an inwardly curved shape. Even in this case, the first abutting surface 61*a* and the first abutted surface 45*a* can come into surface-abutment. Alternatively, each of the first abutting surface 61*a* and the first abutted surface 45*a* may be formed of a plurality of flat surfaces with different orientations. Even in this case, the first abutting surface 61*a* and the first abutted surface 45*a* can come into surface-abutment. These modifications to the shape of the abutting surface and the abutted surface are applicable to any two surfaces abutting each other, such as the second abutting surface 53*a* and the second abutted surface 62*a* in Embodiment 1, and the first abutting surface 161 and the first abutted surface 145 in Embodiment 2.

Further, for example, at least one of the first abutting surface 61 and the first abutted surface 45 may be covered with an elastic member.

Thus, it is possible to reduce the level of hammering sound or to absorb the impact torque when the first abutting surface 61 and the first abutted surface 45 abut each other. Moreover, if the moving portion 60 or the stop portion 44 is damaged due to abutment between the first abutting surface 61 and the first abutted surface 45, the covering prevents metal pieces from being scattered.

The method of covering the first abutting surface 61 or the first abutted surface 45 with the elastic member is not specifically limited. For example, the first abutting surface 61 or the first abutted surface 45 may be covered with an elastic member by making a resin material adhere to the first abutting surface 61 or the first abutted surface 45 through application, spraying, dipping, or the like, and then drying the resin material. Alternatively, for example, the first abutting surface 61 or the first abutted surface 45 may be covered with rubber serving as an elastic member by bonding rubber thereto through vulcanization adhesion. Further alternatively, the first abutting surface 61 or the first abutted surface 45 may be covered with an elastic member, for example, by heating a heat shrinking tube disposed on the moving portion 60 or the stop portion 44 to cover the entire moving portion 60 or the entire stop portion 44 with the tube.

In the rotary member 50 according to Embodiment 1, for example, the first rotary member 51 that rotates with the steering shaft 32 and the second rotary member 55 that is rotatable with respect to the steering shaft 32 are arranged in the axial direction. However, these two types of rotary members may be arranged concentrically about the steering shaft 32.

For example, the second rotary member may be disposed to surround the outer periphery of the first rotary member that rotates together with the steering shaft 32, and an outer peripheral protrusion provided on the outer periphery of the first rotary member may be disposed to abut an inner peripheral protrusion disposed on the inner periphery of the second rotary member. In this case, the first rotary member rotates with the steering shaft 32, and the outer peripheral protrusion of the first rotary member abuts the inner peripheral protrusion of the second rotary member, so that the second rotary member rotates with the first rotary member. After that, a moving portion fixed to the outer periphery of the second rotary member abuts a stop portion disposed on the housing 40a, so that rotation of the second rotary member stops. Consequently, rotation of the first rotary member and the steering shaft 32 also stops.

In this manner, the first rotary member attached to the steering shaft 32 is disposed on the inner side of the second rotary member that abuts the stop portion, so that it is possible to apply the resisting force of the stop portion to the first rotary member from the radially outer side. That is, when stopping rotation of the first rotary member, it is possible to stop rotation of the first rotary member with a relatively large torque in the direction opposite to the rotation. Accordingly, for example, even when the steering wheel 21 is rotated by a relatively large force, it is possible to reliably stop the rotation with a simple configuration. Further, the axial size of the stopper unit can be reduced.

Further, similar to the first abutting surface 61 and the first abutted surface 45 of Embodiment 1, the abutting surfaces of the moving portion and the stop portion, and the abutting surfaces of the outer peripheral protrusion and the inner peripheral protrusion are inclined such that part of the force received upon abutment is directed away from the abutment counterpart in the axial direction. This configuration reduces the risk of damage to the portions that directly receive the impact, namely, the moving portion, the stop portion, the outer peripheral protrusion, and the inner peripheral protrusion.

In this case, for example, the second rotary member may be formed in a bottomed cylindrical shape, and the bottom may have an opening for insertion of the steering shaft 32. Thus, it is possible to support the second rotary member on the steering shaft 32, and to arrange the inner peripheral protrusion and the stop portion on the radially outer side of the first rotary member.

Further, the rotary member 50 according to Embodiment 1 has a two-stage configuration including the first rotary member 51 and the second rotary member 55. However, the rotary member 50 may include a plurality of rotary members in addition to the first rotary member 51 that rotates with the steering shaft 32. That is, the rotary member 50 does not have to have a two-stage configuration, and may have a configuration of three or more stages. Thus, it is possible to further expand the rotation range of the steering shaft 32 compared to the case where the rotary member 50 has a two-stage configuration.

Further, the rotary member 50 does not have to be disposed on the end of the steering shaft 32 extending out of the reducer 40. For example, the rotary member 50 may be disposed on the steering wheel 21 side on the steering shaft 32 with respect to the reducer 40. That is, as long as the rotary member 50 is disposed in an axial position on the shaft member coupled to the steering wheel 21, it is possible to mechanically restrict the rotation range of the shaft member with a simple configuration. It is also possible to achieve advantageous effects such as a reduction in size of the steering apparatus 30.

Further, the stop portion 44 does not have to be included in the housing 40a. For example, the stop portion 44 may be fixed to the housing 40a through another member fixed to the housing 40a. Furthermore, the stop portion 44 does not have to be disposed on the housing 40a of the reducer 40. That is, as long as the stop portion is disposed on a support member that supports the shaft member coupled to the steering wheel 21, it is possible to configure the stopper unit for restricting the rotation range of the shaft member to have a simple and compact structure.

Further, the moving portion 60 does not have to be arranged on the steering shaft 32 by attaching the rotary member 50 to the steering shaft 32. For example, a projection that projects in the radial direction may be provided on the steering shaft 32 such that the projection serves as a moving portion. That is, the rotation range of the steering shaft 32 may be restricted when a first abutting surface formed on the projection abuts the first abutted surface 45 of the stop portion 44 fixed to the housing 40a.

Further, the biasing member 70 may be implemented by a member different from an arcuate C-shaped snap ring. For example, the biasing member may be any member, such as a beveled snap ring or a push nut, capable of applying a biasing force to an adjacent component and serving as a retainer for the members including the rotary member 50. Alternatively, for example, the biasing member may be implemented by a combination of a plurality of components, such as a helical spring that biases the rotary member 50 and a retainer for fixing the helical spring to the steering shaft 32.

A vehicle steering apparatus according to the present disclosure is capable of mechanically restricting the rotation range of a shaft member that rotates in accordance with an operation of a steering member, and is applicable to, for example, a vehicle steering apparatus in a linkless steer-by-wire steering system.

What is claimed is:

1. A vehicle steering apparatus provided in a steering mechanism mechanically separated from a steering operation mechanism, the vehicle steering apparatus comprising:
    a shaft member configured to rotate in accordance with an operation on a steering member;
    a moving portion configured to move in a circumferential direction of the shaft member in accordance with rotation of the shaft member, the moving portion being configured to restrict rotation of the shaft member when movement of the moving portion is stopped;
    a support member including a shaft support portion rotatably supporting the shaft member; and
    a stop portion disposed on the support member, the stop portion being configured to abut the moving portion to stop movement of the moving portion;
    the moving portion including a first abutting surface that faces the stop portion in the circumferential direction;
    the first abutting surface being inclined with respect to an axial direction of the shaft member to face a shaft support portion side when the moving portion is viewed in a radial direction of the shaft member; and
    the stop portion including a first abutted surface that abuts the first abutting surface.

2. The vehicle steering apparatus according to claim 1, wherein:
    the moving portion is fixed to a rotary member; and
    the rotary member is attached to the shaft member, the rotary member being configured to rotate about the shaft member in accordance with rotation of the shaft member.

3. The vehicle steering apparatus according to claim 2, wherein:
    the rotary member includes a first rotary member and a second rotary member;
    the first rotary member is attached to the shaft member so as to be engaged with the shaft member in the circumferential direction;
    the second rotary member is relatively rotatably supported on the shaft member, the second rotary member is configured to rotate in accordance with rotation of the first rotary member when abutting the first rotary member in the circumferential direction;

the moving portion is fixed to the second rotary member;

the first rotary member includes a second abutting surface inclined with respect to the axial direction;

the second abutting surface is inclined in a same direction as the first abutting surface;

the second rotary member includes a second abutted surface; and the second abutted surface is inclined with respect to the axial direction, abuts the second abutting surface, and is inclined in a same direction as the first abutted surface.

4. The vehicle steering apparatus according to claim 2, further comprising:

a biasing member attached to the shaft member, the biasing member being configured to bias the rotary member toward the shaft support portion in the axial direction.

5. The vehicle steering apparatus according to claim 1, wherein the first abutted surface is inclined in a direction parallel to the first abutting surface so as to come into surface-abutment with the first abutting surface.

6. The vehicle steering apparatus according to claim 1, wherein at least one of the first abutted surface and the first abutting surface is covered with an elastic member.

7. A vehicle steering apparatus provided in a steering mechanism mechanically separated from a steering operation mechanism, the vehicle steering apparatus comprising:

a shaft member configured to rotate in accordance with an operation on a steering member;

a moving portion configured to move in a circumferential direction of the shaft member in accordance with rotation of the shaft member, the moving portion being configured to restrict rotation of the shaft member when movement of the moving portion is stopped;

a support member including a shaft support portion rotatably supporting the shaft member; and a stop portion disposed on the support member, the stop portion being configured to abut the moving portion to stop movement of the moving portion;

the moving portion including a first abutting surface that faces the stop portion in the circumferential direction;

the stop portion including a first abutted surface that abuts the first abutting surface; and the first abutted surface being inclined with respect to an axial direction of the shaft member to face away from the shaft support portion when the stop portion is viewed in a radial direction of the shaft member.

8. The vehicle steering apparatus according to claim 7, wherein:

the moving portion is fixed to a rotary member; and the rotary member is attached to the shaft member, the rotary member being configured to rotate about the shaft member in accordance with rotation of the shaft member.

9. The vehicle steering apparatus according to claim 8, wherein:

the rotary member includes a first rotary member and a second rotary member;

the first rotary member is attached to the shaft member so as to be engaged with the shaft member in the circumferential direction;

the second rotary member is relatively rotatably supported on the shaft member, the second rotary member is configured to rotate in accordance with rotation of the first rotary member when abutting the first rotary member in the circumferential direction;

the moving portion is fixed to the second rotary member;

the first rotary member includes a second abutting surface inclined with respect to the axial direction;

the second abutting surface is inclined in a same direction as the first abutting surface;

the second rotary member includes a second abutted surface; and the second abutted surface is inclined with respect to the axial direction, abuts the second abutting surface, and is inclined in a same direction as the first abutted surface.

10. The vehicle steering apparatus according to claim 8, further comprising:

a biasing member attached to the shaft member, the biasing member being configured to bias the rotary member toward the shaft support portion in the axial direction.

11. The vehicle steering apparatus according to claim 7, wherein the first abutted surface is inclined in a direction parallel to the first abutting surface so as to come into surface-abutment with the first abutting surface.

12. The vehicle steering apparatus according to claim 7, wherein at least one of the first abutted surface and the first abutting surface is covered with an elastic member.

* * * * *